UNITED STATES PATENT OFFICE.

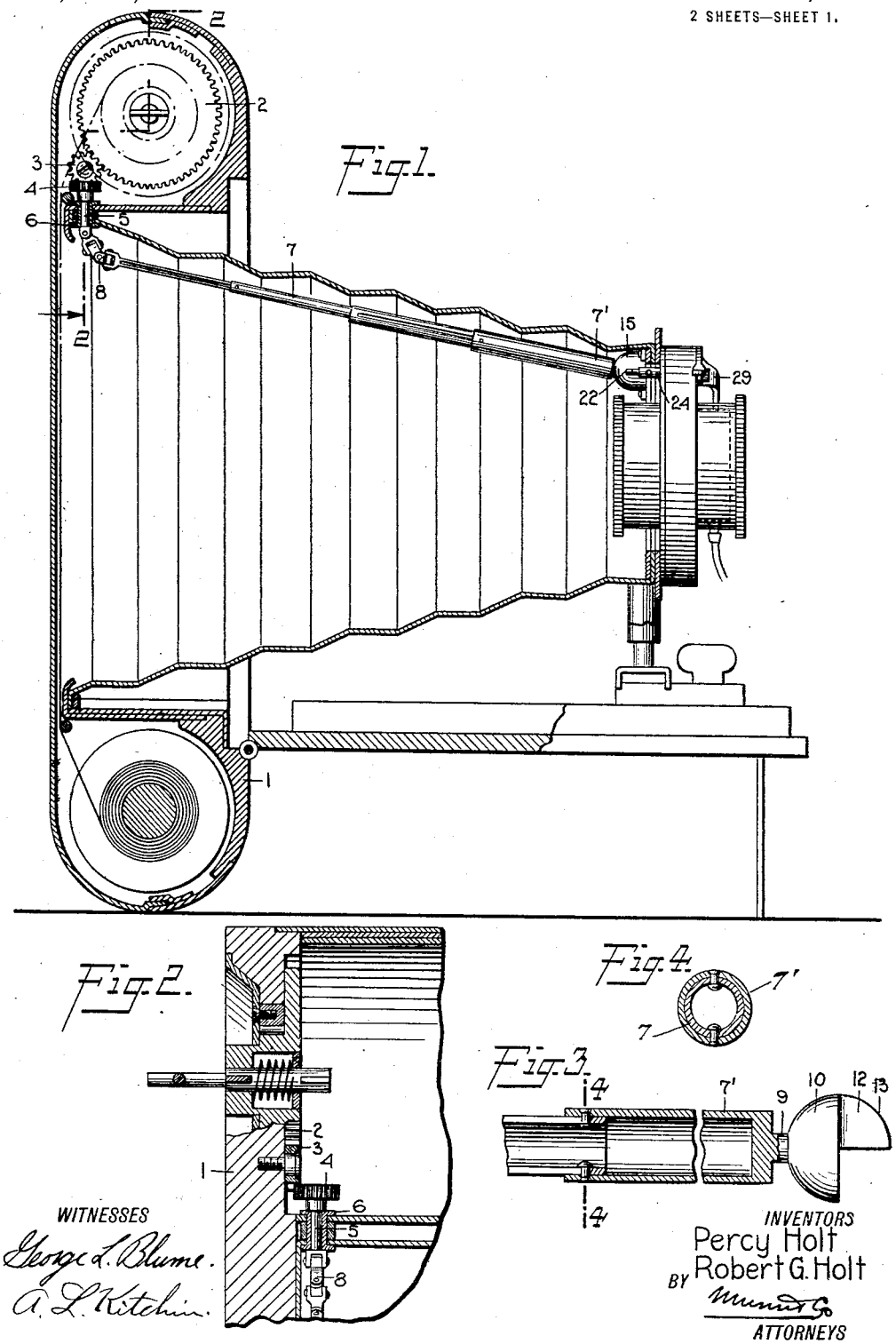

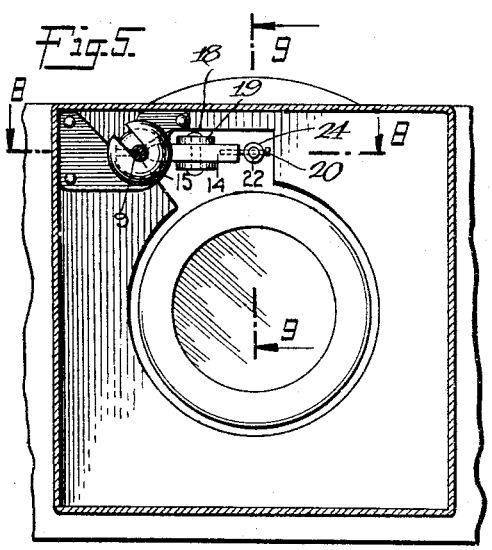
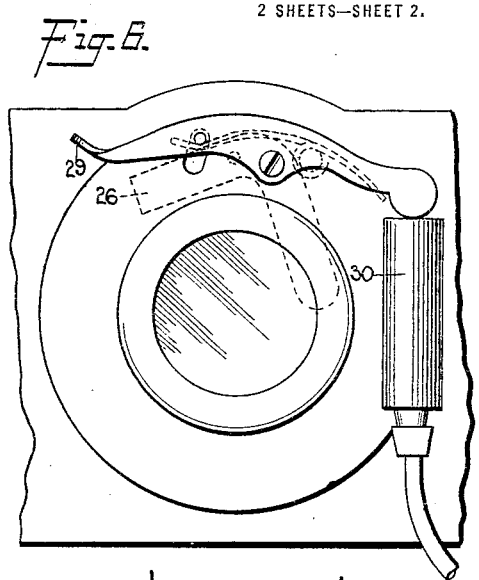
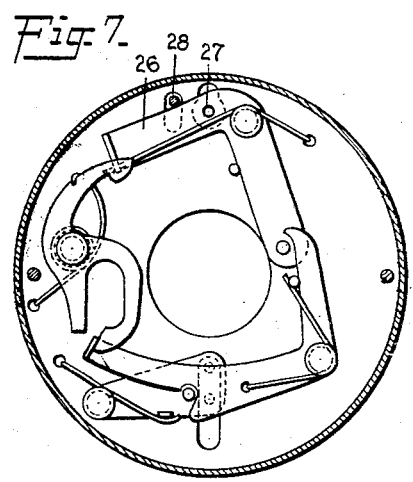
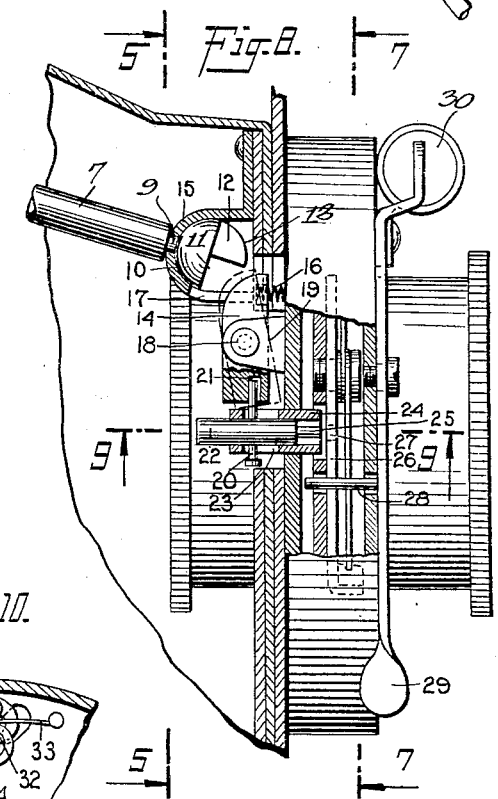
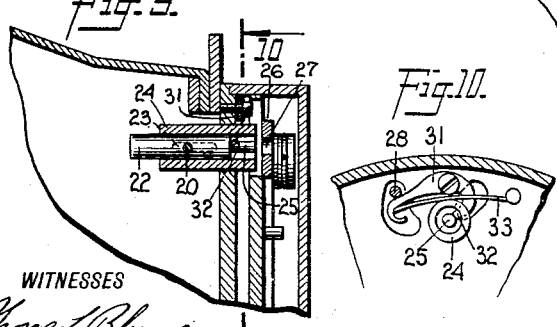

PERCY HOLT AND ROBERT G. HOLT, OF PROVIDENCE, RHODE ISLAND.

AUTOMATIC CAMERA-SHUTTER LOCK.

1,175,632.  Specification of Letters Patent.  Patented Mar. 14, 1916.

Application filed March 4, 1915. Serial No. 12,057.

*To all whom it may concern:*

Be it known that we, PERCY HOLT and ROBERT G. HOLT, both citizens of the United States, and residents of Providence, in the county of Providence and State of Rhode Island, have invented a new and Improved Automatic Camera-Shutter Lock, of which the following is a full, clear, and exact description.

This invention relates to improvements in camera attachments, and particularly to an automatic stop for shutters.

The object in view is to provide an improved stop structure which will positively prevent a second operation of the shutter until the stop has been released.

Another object of the invention is to produce a mechanism connected with the film shifting structure and with the shutter whereby the film shifting mechanism may release the locking mechanism arranged adjacent the shutter in order that one exposure may be produced for each film.

A further object in view is to provide a locking member arranged to lock the shutter operating mechanism against movement after the same has been once operated, this locking mechanism being connected with the film shifting device so that the locking mechanism may be released on each substitution of a new film in back of the shutter.

In the accompanying drawings—Figure 1 is a longitudinal vertical section through a camera showing an embodiment of the invention applied thereto; Fig. 2 is an enlarged detailed fragmentary sectional view through Fig. 1 approximately on line 2—2; Fig. 3 is a detailed fragmentary sectional view through the forward end of the power transmitting means; Fig. 4 is a section through Fig. 3 on line 4—4; Fig. 5 is a sectional view through Fig. 8 on line 5—5; Fig. 6 is a front view of an ordinary shutter with an embodiment of the invention applied thereto; Fig. 7 is a section through Fig. 8 on line 7—7; Fig. 8 is a fragmentary sectional view through Fig. 5 on line 8—8, the same being shown on an enlarged scale; Fig. 9 is a sectional view through Fig. 8 on line 9—9; Fig. 10 is an enlarged fragmentary sectional view through Fig. 9 on line 10—10.

Referring to the accompanying drawings by numerals, 1 indicates a camera of any desired kind, as for instance a camera of the well known collapsing variety. The camera may be provided with a bellows as shown in Fig. 1, or may be of the box type without departing from the spirit of the invention. When having a bellows as shown in Fig. 1 the roll on which the film is to be wound is provided with a gear wheel 2 meshing with a pinion 3. The pinion 3 also meshes with a second pinion 4 rigidly connected with shaft 5. Shaft 5 is mounted in a suitable journal 6, and is connected to a power member 7 through a suitable universal joint 8 so that when shaft 5 is rotated the power member 7 will be rotated likewise. The power member 7 may be made of any desired structure so as to transmit movement, preferably, from a plurality of telescoping sections as shown in Fig. 4, the front section 7' being provided with a neck 9 (Fig. 3) merging into a ball 10. The ball 10 is cut away at 11 so that one half of the ball remains plus a cam member 12. The cam member 12 is merely a web or enlargement having a curved surface 13 which upon each revolution strikes the lever 14 (Fig. 8). The neck 9 extends through a socket or casing 15 so that the ball 10 may have a good bearing and may always be in the same relative position and readily engage lever 14 and depress the same against the action of spring 16. The lever 14 extends through a suitable slot 17 in the casing 15 so as to be in a position to be engaged by the cam 12 while being pivotally mounted at 18 on a suitable bracket 19. The pin 20 loosely fits into a socket 21 in lever 14, said pin being rigidly secured to a reciprocating pin 22. Pin 20 is allowed a movement bodily back and forth by reason of the slots 23 arranged in the guiding sleeve 24. The reciprocating pin 22 is provided with a reduced extension 25, which extension is adapted to press against the lever 26 as soon as the pin is released, and to snap into aperture 27 as soon as the aperture comes opposite the pin. This will lock lever 26 against any further movement until the extension 25 has been withdrawn from aperture 27. As it is necessary to operate lever 26 in order to operate the shutter of the camera no further movement of the shutter can be made until this lever has been released. Lever 26 is of the usual construction found in cameras and forms by itself no part of the present invention but only the combination with the pin 22 and associated parts.

The shutter mechanism shown in the drawing is of the well known variety found in cameras, and will not be further described than necessary for fully setting forth the invention as the invention is capable of being used with different forms of shutters and shutter mechanism. The lever 26 is operated by a pin 28 which extends through a suitable slot in the shutter casing, and which is rigidly secured to a hand lever 29 of the usual type for operating the shutter, this lever being also associated with a pneumatic attachment 30 which may be operated instead of the lever 29. When the lever 29 is operated either manually or by the pneumatic means 30, pin 28 is moved downwardly from the position shown in Fig. 7 to near the bottom of the slot, and in its movement will move lever 26 which will cause the proper operation of the shutter. The pin 28 will also in addition to moving lever 26 move the catch 31. (Fig. 10) which catch has the end 32 normally projecting beneath the shoulder arranged at the juncture between extension 25 and the body of the reciprocating pin 22. A spring 33 tends to normally hold the end 32 in engagement with extension 25 so that whenever the same is released pin 22 will be engaged. The end 32 maintains the reciprocating pin 22 in its retracted position as shown in Figs. 8 and 9, but when released the pin 22 moves toward lever 26 until extension 25 strikes the lever. When the aperture 27 is moved opposite the extension 25 said extension will automatically move into said aperture and lock lever 26 against movement. This movement of the pin 22 is caused by the spring 16 which not only tends to move lever 14 but also acts through lever 14 in order to give pin 22 a continuous tendency to move from the position shown in Fig. 9 to a projected position with extension 25 fitting in aperture 27.

It will be noted that the locking mechanism above set forth does not interfere with the usual operation of the shutter, and also does not require any change in the usual construction of shutter. The use of a reciprocating pin which acts as a stop presents a positive lock and not a mere indication so that it is physically impossible to operate the shutter a second time on a film which has once been exposed. The arrangement of the gear wheels 2, 3, 4 and associated parts is such as to provide at least one revolution of the ball 10 before a new film is substituted for the old film. One revolution of the ball 10 with the cam 12 will cause the pin 22 to be restored to its retracted position as shown in Figs. 8 and 9. Additional revolutions of ball 10 will not in any way affect the pin 22 unless the same has been released by an operation of the shutter. The pin or stop 22 is in fact a member which moves into the path of movement of one of the shutter operating parts, but if the shutter was sufficiently strong it could be arranged to move into the path of movement of the shutter without departing from the spirit of the invention. This provision of a stop is intended to cover the use of stops at any desired point which will move into the path of movement of some moving part which is essential to the shutter, as for instance the shutter itself, a lever for operating the shutter, or other connected member.

What we claim is—

1. In a device of the character described, the combination with a camera having a shutter, of a lock therefor arranged to lock the shutter against movement, and means operatively connected with the film moving structure of the camera connected with said first mentioned means, said second mentioned means including a plurality of rotating elements arranged to transmit power to the first mentioned means regardless of the position of the first mentioned means.

2. In a device of the character described, the combination with a camera having a shutter mechanism, of a lock therefor, said lock comprising a reciprocating pin arranged to extend into the path of movement of the operating mechanism of the shutter so as to prevent the operation of the shutter, a spring for normally pressing said pin so as to cause the same to move into the path of movement of said operating parts, means for withdrawing said pin, and a catch for holding said pin in its withdrawn position.

3. In a device of the character described, the combination with a camera, of a lock for the shutter thereof, said lock comprising a movable stop adapted to be forced into the path of movement of the operating mechanism of said shutter for preventing the operation of said shutter, a lever for withdrawing said stop, a catch engaging said stop for holding the stop in its withdrawn position, and means operated by the releasing mechanism of the shutter for releasing said catch whereby said stop will be thrust into the path of movement of the shutter operating mechanism for each operation of the shutter.

4. In a device of the character described, the combination with a camera provided with a shutter and means for operating the same, said means including a lever, said lever being formed with an aperture, a reciprocating stop arranged opposite said lever, a spring pressed member for actuating said stop and for resiliently pressing the same against said lever when the stop is released whereby when said lever is operated said aperture therein will come opposite said stop and said stop will move into said aperture, thereby locking the lever against further movement, means for withdrawing said stop, and a pin actuated by the releasing mechanism of the shutter for releasing said stop simultaneously with the movement of said lever.

5. In a device of the character described, the combination with a camera provided with a shutter and an operating lever for the shutter, said operating lever having an aperture therein, a reciprocating pin adapted to strike said lever when the pin is released and moved into said aperture when the same is brought into alinement therewith whereby said lever and the shutter associated therewith will be locked, a spring pressed member engaging said pin for resiliently pressing the pin toward said lever, a rotating cam member acting on said spring pressed member for moving the same in such a direction as to withdraw said pin, means connecting said cam member with the film shifting structure of the camera whereby when a film is shifted said cam member will be operated, a catch for normally holding said pin in its retracted position, and means operated by the releasing mechanism of the shutter engaging said catch and releasing the same from said pin.

In testimony whereof we have signed our names to this specification in the presence of two subscribing witnesses.

PERCY HOLT.
ROBERT G. HOLT.

Witnesses:
 JANE HOLT,
 LEAH G. HOLT.

Copies of this patent may be obtained for five cents each, by addressing the "Commissioner of Patents, Washington, D. C."